United States Patent
Woo et al.

(10) Patent No.: US 11,890,582 B2
(45) Date of Patent: Feb. 6, 2024

(54) HIGHLY RETENTIVE POLYAMIDE HOLLOW FIBER MEMBRANES PRODUCED VIA CONTROLLED SHRINKAGE

(71) Applicant: ENTEGRIS, Inc., Billerica, MA (US)

(72) Inventors: Maybelle Woo, Dedham, MA (US); Jeffrey E. Townley, Lowell, MA (US); Kwok-Shun Cheng, Nashua, MA (US)

(73) Assignee: ENTEGRIS, INC., Billerica, MA (US)

(*) Notice: Subject to any disclaimer, the term of this patent is extended or adjusted under 35 U.S.C. 154(b) by 87 days.

(21) Appl. No.: 16/312,653

(22) PCT Filed: Jun. 26, 2017

(86) PCT No.: PCT/US2017/039203
§ 371 (c)(1),
(2) Date: Dec. 21, 2018

(87) PCT Pub. No.: WO2018/005326
PCT Pub. Date: Jan. 4, 2018

(65) Prior Publication Data
US 2019/0255489 A1  Aug. 22, 2019

Related U.S. Application Data

(60) Provisional application No. 62/355,001, filed on Jun. 27, 2016.

(51) Int. Cl.
*B01D 69/08* (2006.01)
*B01D 69/02* (2006.01)
(Continued)

(52) U.S. Cl.
CPC ............ *B01D 69/08* (2013.01); *B01D 61/14* (2013.01); *B01D 63/02* (2013.01);
(Continued)

(58) Field of Classification Search
CPC ...... B01D 69/02; B01D 69/08; B01D 69/081; B01D 69/087; B01D 61/14; B01D 63/02;
(Continued)

(56) References Cited

U.S. PATENT DOCUMENTS 5,783,079 A    7/1998 Kumano et al.
7,347,937 B1 *  3/2008 Cheng ................. B01D 61/145
                                                210/321.78
(Continued)

FOREIGN PATENT DOCUMENTS

CN    103223300 A    7/2013
EP    2 671 628 A1   11/2013
(Continued)

OTHER PUBLICATIONS

Khan, W.; "Desalination of raw water using a polyamide hollow fiber membrane"; Desalination, vol. 244, Issues 1-3, http://www.desline.com/articoli/9759.pdf; abstract only; 2009.
(Continued)

*Primary Examiner* — John Kim

(57) ABSTRACT

Described herein is a polyamide hollow fiber membrane and methods of making and using the hollow fiber membrane. The polyamide hollow fiber membrane has an isopropanol permeability of from about 5 L/m2 h bar to about 150 L/m2 h bar and a particle rejection percentage of about 100% for particles having a nominal diameter of from about 1 nm to about 25 nm. The polyamide hollow fiber membranes described herein are particularly useful for photoresist filtration, for example.

11 Claims, 8 Drawing Sheets

(51) Int. Cl.
B01D 63/02 (2006.01)
B01D 61/14 (2006.01)
B01D 67/00 (2006.01)
B01D 71/56 (2006.01)

(52) U.S. Cl.
CPC ......... B01D 67/0016 (2013.01); B01D 69/02 (2013.01); B01D 69/081 (2013.01); B01D 69/087 (2013.01); B01D 71/56 (2013.01); B01D 2325/20 (2013.01)

(58) Field of Classification Search
CPC . B01D 67/0016; B01D 71/56; B01D 2325/20
See application file for complete search history.

(56) References Cited

U.S. PATENT DOCUMENTS

| | | | | |
|---|---|---|---|---|
| 7,445,710 | B2* | 11/2008 | Stankowski | B01D 29/21 210/232 |
| 9,950,300 | B2 | 4/2018 | Hara | |
| 2003/0159980 | A1* | 8/2003 | Barss | B01D 69/12 210/500.39 |
| 2005/0095486 | A1 | 5/2005 | Hamamoto | |
| 2009/0029136 | A1* | 1/2009 | Hayashi | B01D 67/0025 428/220 |
| 2013/0210596 | A1* | 8/2013 | Hattori | B31C 3/00 493/287 |
| 2015/0209735 | A1* | 7/2015 | Hara | B01D 71/56 264/203 |
| 2015/0367291 | A1* | 12/2015 | Hornung | B01D 69/088 210/651 |
| 2017/0029462 | A1 | 2/2017 | Hamamoto | |

FOREIGN PATENT DOCUMENTS

| | | |
|---|---|---|
| JP | S5123482 A | 2/1976 |
| JP | 6063202 A | 4/1985 |
| JP | 3250644 B2 | 1/2002 |
| JP | 2004204160 A | 7/2004 |
| JP | 2010508140 A | 3/2010 |
| JP | 2016068004 A | 5/2016 |
| KR | 102015068216 A | 6/2015 |
| WO | 2008/103599 A2 | 8/2008 |
| WO | 2014030585 A1 | 2/2014 |

OTHER PUBLICATIONS

Sun, et al. ; "Novel polyamide-imide/cellulose acetate dual-layer hollow fiber membranes for nanofiltration"; Journal of Membrane Science, 363(1-2) 232-242; Abstract Only; 2010.
"Filtration-Mechanism and Filter Medium / Filter Aid", Chijinshokan Co., Ltd., Nov. 20, 1992, pp. 43-44 (non-official translation)—English Abstract Only.
"Optimal Selection and Efficiency Improvement of Filtration Process", Joho Kiko Co., Ltd., Oct. 22, 2010, pp. 7 and 14-15. (non-official translation)—English Abstract Only.
Document describing the viscosity of isopropanol, Available online at: <https://anzeninfo.mhlw.go.jp/anzen/gmsds/0928.html>, Feb. 19, 2006, 7 pages.
Document describing the viscosity of water, Available online at: <https://www.as-1.co.jp/academy/24/24-2.html >, 2016, 2 pages.
Ozaki et al., "Study on Sludge Accumulation Process in External Pressure-Type Cross Flow Filtration of Activated Sludge Suspension by Hollow Fiber Membrane", JSCE Journal No. 551 / II-37, Nov. 1996, pp. 123-134.—English Abstract Only.

* cited by examiner

HIGHLY RETENTIVE POLYAMIDE HOLLOW FIBER MEMBRANES PRODUCED VIA CONTROLLED SHRINKAGE

RELATED APPLICATIONS

This application is filed under the provisions of 35 U.S.C. § 371 claiming priority of International Patent Application No. PCT/US2017/039203 filed on Jun. 26, 2017, which further claims the benefit of priority under 35 U.S. C. § 119 of U.S. Provisional Patent Application No. 62/355,001, filed 27 Jun. 2016 is hereby claimed. The disclosure of U.S. Provisional Patent Application No. 62/355,001 is incorporated herein by reference, in its entirety, for all purposes.

FIELD

The disclosure relates to producing a polyamide hollow fiber membrane with high retention for small particles.

BACKGROUND

Polyamide hollow fiber membranes have been produced for a variety of applications, including dialysis, water filtration and pharmaceutical and semiconductor filtration. Typically, polyamide hollow fiber membranes are made by immersion cast spinning or thermally-induced phase separation (TIPS). Because polyamides are not soluble in many solvents at room temperature, a strong solvent such as formic acid must be used in immersion casting processes. This is neither environmentally safe nor desirable from a processing standpoint. The TIPS process is more benign, but the elevated temperatures required makes it more difficult to form hollow fibers as viscosity is significantly lowered at higher temperatures.

TIPS has been used to produce polyamide hollow fibers, but none of the resulting hollow fibers has shown high retention for very small particles. For example, U.S. Pat. No. 8,800,783 discloses a polyamide hollow fiber membrane produced by TIPS. The formed hollow fiber membrane has a 0.1 micron (100 nm) particle rejection percentage of 100%. However, there is no mention of high retention for a smaller test particle such as 5- or 25-nm test particle.

U.S. Patent Appln. Publication No. US 2003/0159984 discloses a method for producing a polyamide membrane using thermally-induced liquid-liquid phase separation. A solution of polyamide and solvent system, comprising a solvent and nonsolvent for the polyamide, is extruded through a die and cooled by means of a cooling medium whereby phase separation occurs and the polymer-rich phase solidifies to form the membrane structure. The formed hollow fiber membrane had a maximum pore diameter of 0.57 microns as determined by bubble point measurement using isopropanol. No particle rejection testing is reported.

U.S. Pat. No. 4,666,607 discloses a method and apparatus for producing a polyamide hollow fiber membrane. The process includes extrusion of a polyamide dissolved in a solvent at an elevated temperature through a hollow fiber nozzle with a lumen-filling medium into a specially designed tube with cooling liquid to form a porous shaped body. The resulting fiber had a maximum pore size of 0.29 microns, as determined by bubble point measurement using ethanol. No particle rejection testing is reported.

Accordingly, there is a need for a process for producing a polyamide hollow fiber membrane open to fluid flow and having high retention for particles having a nominal diameter of less than 100 nm.

SUMMARY

Described herein is a polyamide hollow fiber membrane and methods of making and using the hollow fiber membrane, for example, in photoresist filtration, dialysis, waste water treatment, protein purification and gas adsorption. The polyamide hollow fiber membrane has an isopropanol permeability of from about 5 $L/m^2$ h bar to about 150 $L/m^2$ h bar and a particle rejection percentage of about 100% for particles having a nominal diameter of from about 1 nanometer (nm) to about 25 nm.

Also described herein is a fluid separation module. The fluid separation module comprises a housing having a feed port and a permeate port and a separation element positioned within the housing. The separation element divides the housing into a first volume and a second volume fluidly sealed from the first volume, and comprises a plurality of polyamide hollow fiber membranes. Each polyamide hollow fiber membrane has a first end portion and a second end portion, a lumen that is open to fluid flow and an isopropanol permeability of from about 5 $L/m^2$ h bar to about 150 $L/m^2$ h bar and a particle rejection percentage of about 100% for particles having a nominal diameter of from about 1 nm to about 25 nm. The feed port is in fluid communication with the first volume and the permeate port is in fluid communication with the second volume. At least a fraction of fluid fed into the feed port permeates the plurality of polyamide hollow fiber membranes and thereby forms a permeate, which flows out of the permeate port.

Also described herein is a polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm. The polyamide hollow fiber membrane is prepared according to a process comprising forming a slurry of polyamide resin and water-soluble organic solvent, extruding the slurry through a hollow fiber spinneret into water maintained at a temperature sufficient to induce coagulation of the slurry to form a hollow fiber, and extracting the water-soluble organic solvent from the hollow fiber using water to form the hollow fiber membrane. The hollow fiber or hollow fiber membrane is wound onto a compressible frame. The hollow fiber membrane is dried on the compressible frame, thereby producing the polyamide hollow fiber membrane open to fluid flow.

Also provided herein is a process for producing a polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm. The process comprises forming a slurry of polyamide resin and water-soluble organic solvent. The slurry is extruded through a hollow fiber spinneret into water maintained at a temperature sufficient to induce coagulation of the slurry to form a hollow fiber and the water-soluble organic solvent is extracted from the hollow fiber using water to form the hollow fiber membrane. The hollow fiber or hollow fiber membrane is wound onto a compressible frame. The hollow fiber membrane is dried on the compressible frame, thereby producing the polyamide hollow fiber membrane open to fluid flow.

The present method can produce membranes with small pore sizes and high retention for small particles. In fact, polyamide flat sheet membranes with similar or tighter pore sizes do not yield such high retention. Harsh chemicals, such as formic acid used in immersion cast processes, are not required and the slurry composition is simple and composed of materials that are generally benign. In contrast, U.S. Pat. No. 4,666,607 and U.S. Patent Appln. Publication No. US 2003/0159984 require the addition of stabilizers and/or thickening agents to form fibers, and U.S. Pat. No. 8,800,783 uses dipolar aprotic solvents, which tend to be toxic and have high skin penetration.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Figure 1A:
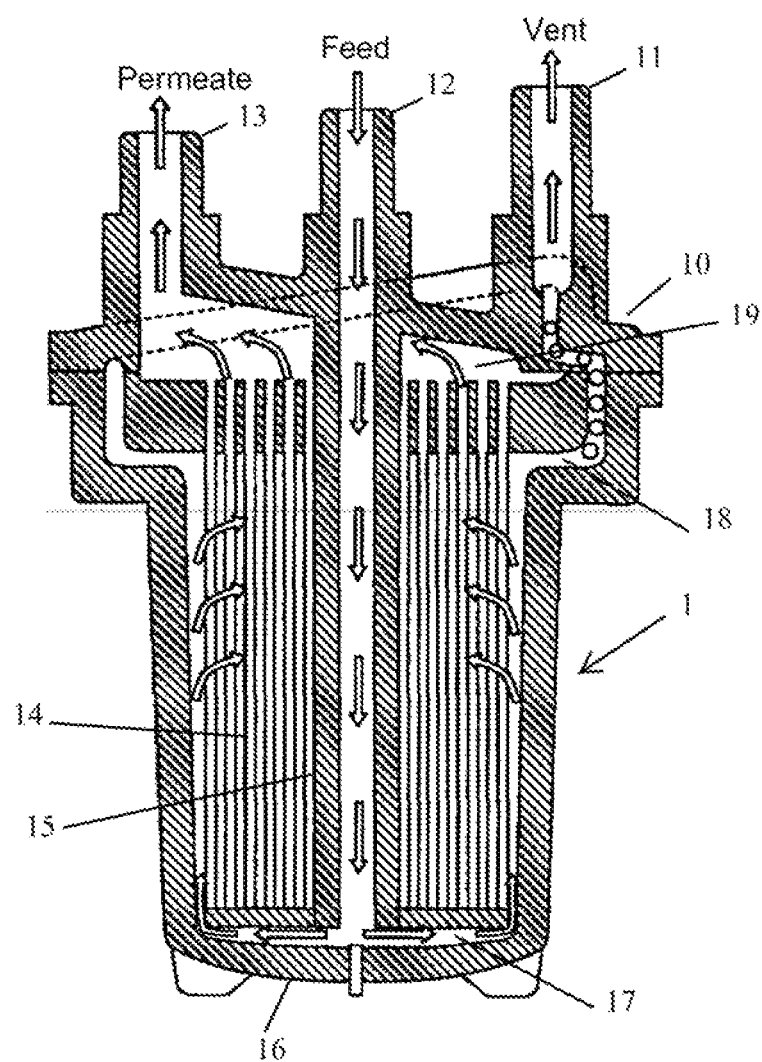
FIG. 1A is a cross-sectional side view of a dead-ended fluid separation module according to this disclosure, and shows a fluid separation module wherein a first end of a hollow fiber bundle is open and a second end of the hollow fiber bundle is sealed and fluid permeates from outside of each hollow fiber into the lumen of each hollow fiber.

While this disclosure will be particularly shown and described with references to example embodiments thereof, it will be understood by those skilled in the art that various changes in form and details may be made therein without departing from the scope of the disclosure encompassed by the appended claims.

While various compositions and methods are described, it is to be understood that this disclosure is not limited to the particular compositions, designs, methodologies or protocols described, as these may vary. It is also to be understood that the terminology used in the description is for the purpose of describing the particular version or versions only, and is not intended to limit the scope of the present disclosure which will be limited only by the appended claims.

It must also be noted that as used herein and in the appended claims, the singular forms "a", "an", and "the" include plural reference unless the context clearly dictates otherwise. Thus, for example, reference to a "membrane" is a reference to one or more membranes and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present disclosure. All publications mentioned herein are incorporated by reference in their entirety. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to +10% of the stated value, in other versions the term "about" refers to +2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A description of example embodiments of the disclosure follows.

Provided herein is a polyamide hollow fiber membrane having an isopropanol permeability of from about 5 L/m² h bar to about 150 L/m² h bar and a particle rejection percentage of about 100% for particles having a nominal diameter of from about 1 nm to about 25 nm. The polyamide hollow fiber membranes can be used, for example, for photoresist filtration, dialysis, waste water treatment, protein purification and gas adsorption. In some aspects, the polyamide hollow fiber membrane is for photoresist filtration.

Isopropanol permeability can be determined using an internal flow test. To perform an internal flow test, a hollow fiber membrane is cut to a length of 10 cm. The two ends of the hollow fiber are inserted into a ¼" OD plastic tube 3 cm long to form a loop with the hollow fiber. Hot melt adhesive, such as that used in glue guns for crafts, is inserted into the plastic tube from the side of the cut fiber ends until the tube is filled. Once the glue has cooled, about 0.5 cm is cut off the tube end to reveal a cross section of the hollow fibers. The tube is inserted into the flow tester holder (see FIG. 4) and isopropanol is fed through the sample at a specified pressure (e.g., 14.2 pounds per square inch (psi)) for a predetermined interval at a temperature of 22° C. Then, the isopropanol flowing through the membrane is collected and measured. Isopropanol permeability is calculated from Equation 1:

$$P = \frac{q}{a \times p} \text{ (L/m}^2 \text{ h bar)} \tag{1}$$

q=isopropanol flow rate through the membrane (L/h)
a=πDLx=surface area of the membrane (m²)
D=outer diameter of the fiber (m)
L=length of the fiber (m)
x=number of fibers
p=pressure drop across the membrane (bar)

In some aspects, the isopropanol permeability of a polyamide hollow fiber membrane described herein is from about 10 L/m² h bar to about 150 L/m² h bar, from about 40 L/m² h bar to about 100 L/m² h bar, from about 55 L/m² h bar to about 85 L/m² h bar or from about 65 L/m² h bar to about 85 L/m² h bar. In some aspects, the isopropanol permeability is from about 5 L/m² h bar to about 30 L/m² h bar.

"Particle retention" refers to the percentage of the number of particles that can be removed from a fluid stream by a membrane placed in the fluid pathway of the fluid stream. Particle retention of a hollow fiber membrane can be measured by passing a sufficient amount of an aqueous feed solution of 0.1% Triton X-100, adjusted to pH 9 and containing 8 ppm polystyrene particles having a nominal diameter of 0.03 microns (available from Duke Scientific G25B), to achieve 1% monolayer coverage through a hollow fiber membrane at a pressure of 15 psi, and collecting the permeate through the lumen. The concentration of the polystyrene particles in the permeate can be calculated from the absorbance of the permeate. Particle retention is then calculated using the following equation: particle retention= ([feed]−[filtrate])\[feed]×100%. Particle retention can also be measured by substituting 5 nm gold particles (available from Ted Pella) in propylene glycol monomethyl ether for the aqueous solution containing polystyrene particles described above.

The number (#) of particles necessary to achieve 1% monolayer coverage can be calculated from Equation 2:

$$\text{\# of particles for 1\% monolayer} = \frac{\text{membrane surface area}}{\text{equivalent area of 1 particle}} \times \frac{1}{100} = \frac{\pi D L x}{\frac{\sqrt{3}}{2} d^2} \times \frac{1}{100} \tag{2}$$

D=outer diameter of the fiber (m)
L=length of the fiber (m)
x=number of fibers
d=diameter of the particles (m)

"Nominal diameter," as used herein, is the diameter of a particle as determined by photon correlation spectroscopy (PCS), laser diffraction or optical microscopy. Typically, the calculated diameter, or nominal diameter, is expressed as the diameter of a sphere that has the same projected area as the projected image of the particle. PCS, laser diffraction and optical microscopy techniques are well-known in the art. See, for example, Jillavenkatesa, A., et al.; "Particle Size Characterization;" NIST Recommended Practice Guide; National Institute of Standards and Technology Special Publication 960-1; January 2001.

In some aspects, the particle rejection percentage is about 100% for particles having a nominal diameter of from about 5 nm to about 25 nm, from about 5 nm to about 20 nm, of about 5 nm or about 25 nm.

In some aspects, the polyamide hollow fiber has a mean bubble point (MBP) as described below and in the Examples of from about 50 psi to about 150 psi, from about 50 psi to about 120 psi or from about 70 psi to about 95 psi. In some aspects, the polyamide hollow fiber has a mean bubble point of from about 90 psi to about 150 psi.

"Mean bubble point" (MBP) refers to the pressure at which the ratio of the air flow of a wet hollow fiber membrane to the air flow of a dry hollow fiber membrane is 0.5. Mean bubble point can be measured by pressurizing the lumen of a hollow fiber membrane with air and measuring the air flow as a function of pressure, then submerging the hollow fiber membrane in a low surface tension fluid, such as HFE-7200 (available from 3M Novec Engineered Fluid), and measuring the air flow as a function of pressure.

The polyamide hollow fiber membranes described herein can be made from polyamide 6, polyamide 6,6, polyamide 4,6, polyamide 6,10 or polyamide 12, or a combination of any of the foregoing. In one aspect of the disclosure, the polyamide is polyamide 6.

The polyamide hollow fiber membranes can have an outer diameter (OD) of from about 400 microns to about 1,000 microns, from about 500 microns to about 900 microns, from about 750 microns to about 1,000 microns or from about 500 microns to about 750 microns. The polyamide hollow fiber membranes can have an inner diameter (ID) of from about 200 microns to about 800 microns, from about 300 microns to about 700 microns, from about 250 microns to about 500 microns or from about 500 microns to about 750 microns. In some aspects, the OD of the hollow fiber membrane is from about 400 microns to about 1,000 microns and the ID of the hollow fiber membrane is from about 200 microns to about 800 microns.

The thickness of the polyamide hollow fiber membrane is typically from about 100 microns to about 250 microns. For example, the hollow fiber membrane can have a thickness of from about 100 microns to about 150 microns, from about 200 microns to about 250 microns, from about 125 microns to about 225 microns or from about 150 microns to about 200 microns.

As used herein, "non-sieving membrane" refers to a membrane that captures particles or is optimized to capture particles primarily via non-sieving retention mechanisms. As used herein, "non-sieving retention mechanism" refers to retention that occurs by mechanisms, such as interception, diffusion and adsorption, that are not related to the pressure drop or bubble point of the filter or microporous membrane. Particle adsorption to membrane surfaces can be mediated by, for example, intermolecular Van der Waals and electrostatic forces. Interception occurs when a particle travelling through a membrane cannot change direction fast enough to avoid contact with the membrane. Particle transport due to diffusion results from random or Brownian motion of predominantly small particles, which creates a certain probability that the particles will collide with the filter media. Although not wishing to be bound by any particular theory, it is believed that the polyamide hollow fiber membranes described herein operate as non-sieving membranes, at least at pH values below the pI of the membranes, or about pH 9. Accordingly, in some aspects of the disclosure, the polyamide hollow fiber membrane is non-sieving.

Also provided herein is a fluid separation module. The fluid separation module comprises a housing having a feed port and a permeate port and a separation element positioned within the housing. The separation element divides the housing into a first volume and a second volume fluidly sealed from the first volume, and comprises a plurality of polyamide hollow fiber membranes (e.g., a plurality of potted polyamide hollow fiber membranes or a polyamide hollow fiber bundle). Each polyamide hollow fiber membrane has a first end portion and a second end portion, a lumen that is open to fluid flow and an isopropanol permeability of from about 5 L/m² h bar to about 150 L/m² h bar and a particle rejection percentage of about 100% for particles having a nominal diameter of from about 1 nm to about 25 nm. The feed port is in fluid communication with the first volume and the permeate port is in fluid communication with the second volume. At least a fraction of fluid fed into the feed port permeates the plurality of polyamide hollow fiber membranes and thereby forms a permeate, which flows out of the permeate port. Alternative characteristics of the plurality of hollow fiber membranes (e.g., permeability, MBP, particle rejection) are as described herein.

A hollow fiber membrane or a lumen of a hollow fiber membrane that is "open to fluid flow" is characterized by a circular or substantially circular cross-section along the length or substantially the entire length of the hollow fiber membrane, such that fluid can flow unobstructed along the length or substantially the entire length of the lumen. Hollow fiber membranes that are open to fluid flow are distinct from hollow fiber membranes that are collapsed or partially collapsed along the length of the hollow fiber membrane, as can happen, for example, when a polyamide hollow fiber membrane is dried on a non-compressible frame. Collapsed or partially collapsed fibers often have decreased flow rates compared to their counterparts open to fluid flow and are difficult or impossible to pot because either insufficient bonding occurs between the fiber and the potting resin, which leads to non-integral devices, or the high temperatures used during potting melt the weakened wall of the collapsed or partially collapsed fiber, which causes the fiber wall to become non-uniform or precludes flow through the lumen altogether.

Typically, the first volume and the second volume in the fluid separation modules provided herein are sealed by potting the first end portion of each of the plurality of polyamide hollow fibers in a first potting resin and separately potting the second end of each of the plurality of polyamide hollow fibers in a second potting resin to form a polyamide hollow fiber bundle, which can be integrally bonded to the housing to seal the first volume from the second volume. Accordingly, in some embodiments, the first end portion of each of the plurality of polyamide hollow fibers is potted (e.g., in a first potting resin) and the second end portion of each of the plurality of polyamide hollow fibers is potted (e.g., in a second potting resin) to form a polyamide hollow fiber bundle. Typically, the first and second potting resins are the same. Alternatively, the first and second potting resins are different from one another. The hollow fiber bundle can be integrally bonded to the housing during potting (e.g., in one step) or after formation of the hollow fiber bundle (e.g., during an additional bonding step).

Exemplary potting resins include, but are not limited to, high-density polyethylene (HDPE), maleic anhydride-grafted HDPE or polyamide (e.g., polyamide 12, polyamide 6,12), or any combination of the foregoing. In some aspects, the first and second or first or second end portions of each of the plurality of polyamide hollow fibers is potted in a potting resin comprising 90% HDPE and 10% maleic anhydride-grafted HDPE; polyamide 12; polyamide 6,12; or HDPE; or any combination of the foregoing.

Blended potting resins can be particularly advantageous for integral bonding of a non-polar thermoplastic polymer component (e.g., a polyethylene housing) to a polar thermoplastic component (e.g., a polyamide hollow fiber membrane). In particular, blended resins can enable two physically and/or chemically incompatible materials to be integrally bonded to create a fluid-tight seal in a housing of suitable structural integrity for separation/filtration applications, such as those encountered in the semiconductor manufacturing industry. Accordingly, in some aspects, the potting resin is a blended resin comprising (1) a non-polar thermoplastic polymer and a polar thermoplastic polymer, wherein the polar thermoplastic polymer is greater than about 1% by weight of the total weight percent of the thermoplastic blended potting resin; or (2) a modified thermoplastic polymer comprising polar groups, wherein the polar groups are about 0.1% or greater by weight of the total weight of the modified thermoplastic polymer. 90% by weight HDPE and 10% by weight maleic anhydride-grafted HDPE is a blended potting resin useful in the fluid separation modules described herein.

As used herein, "polar thermoplastic polymer" refers to a polymeric thermoplastic resin comprising polar repeating units (e.g., amide units to create a polyamide) or a modified thermoplastic polymer. In some aspects of a blended resin, the polar thermoplastic polymer is greater than about 5% by weight of the total weight of the blended resin (i.e., greater than about 5% to about 100% by weight of the total weight percent of the blended resin). Suitable polar thermoplastic polymers include, but are not limited to, polyethylene maleic anhydrides, ethylene vinyl alcohols, ethylene vinyl acetates, ethylene acrylic acids and polybutadiene maleic anhydride. Typically, the polar thermoplastic polymer is between about 5% and about 50% by weight of the total weight of the blended resin. For example, the polar thermoplastic polymer can be about 5%, about 10%, about 15%, about 20%, about 25%, about 30%, about 35%, about 40%, about 45% or about 50% by weight of the total weight of the blended resin.

"Modified thermoplastic polymer," as used herein, refers to a non-polar thermoplastic polymer resin that is modified with a polar chemical group (e.g., anhydride-modified polyethylene) or made by copolymerizing non-polar repeating units with polar repeating units (e.g., poly(ethylene-co-vinyl acetate) and poly(ethylene-co-vinyl alcohol)). When a non-polar thermoplastic polymer is modified with a polar group or copolymerized with polar groups (e.g., anhydride modified polyethylene), the polar group is from about 0.1% by weight to about 75% by weight of the total weight of the modified thermoplastic polymer. Suitable modified thermoplastic polymers include, but are not limited to, polyethylene maleic anhydrides, ethylene vinyl alcohols, ethylene vinyl acetates, ethylene acrylic acids and polybutadiene maleic anhydride.

As used herein, "non-polar thermoplastic polymer" refers to a polymer resin that does not contain any polar groups or repeating units, or are otherwise hydrophobic. Examples of non-polar resins include, but are not limited to low density polyethylene, linear low density polyethylene, high density polyethylene, polypropylene, polystyrene, polybutadiene, poly(tetrafluoroethylene-co-perfluoro(alkyvinylether)), TEFLON®, perfluoroalkoxyalkane (PFA) or perfluoromethylalkoxy (MFA).

Blended potting resins can be used either homogeneously or non-homogeneously. To use a blend homogeneously, pellets or powder of the polar and non-polar resins can be mixed and melted in an extruder or a centrifugal potting setup to form a homogeneous melt, which can then be used for potting. To use a blend non-homogeneously, a polar resin can be melted and then applied as a "tie" layer between, for example, a polyamide hollow fiber membrane and a non-polar resin melt separately.

Blended potting resins and methods of making and using blended potting resins are described in U.S. Provisional Appln. No. 62/190,617, filed Jul. 9, 2015 and International Patent Application No. PCT/US2016/040425, Iyer et al., both of these incorporated herein by reference in their entirety except for express definitions.

After potting, first and second ends of the hollow fiber bundle are exposed, for example, by cutting, to reveal the cross-section of the hollow fibers open to fluid flow. First or second end of the hollow fiber bundle can then be sealed, for example, by capping.

Figure 1B:
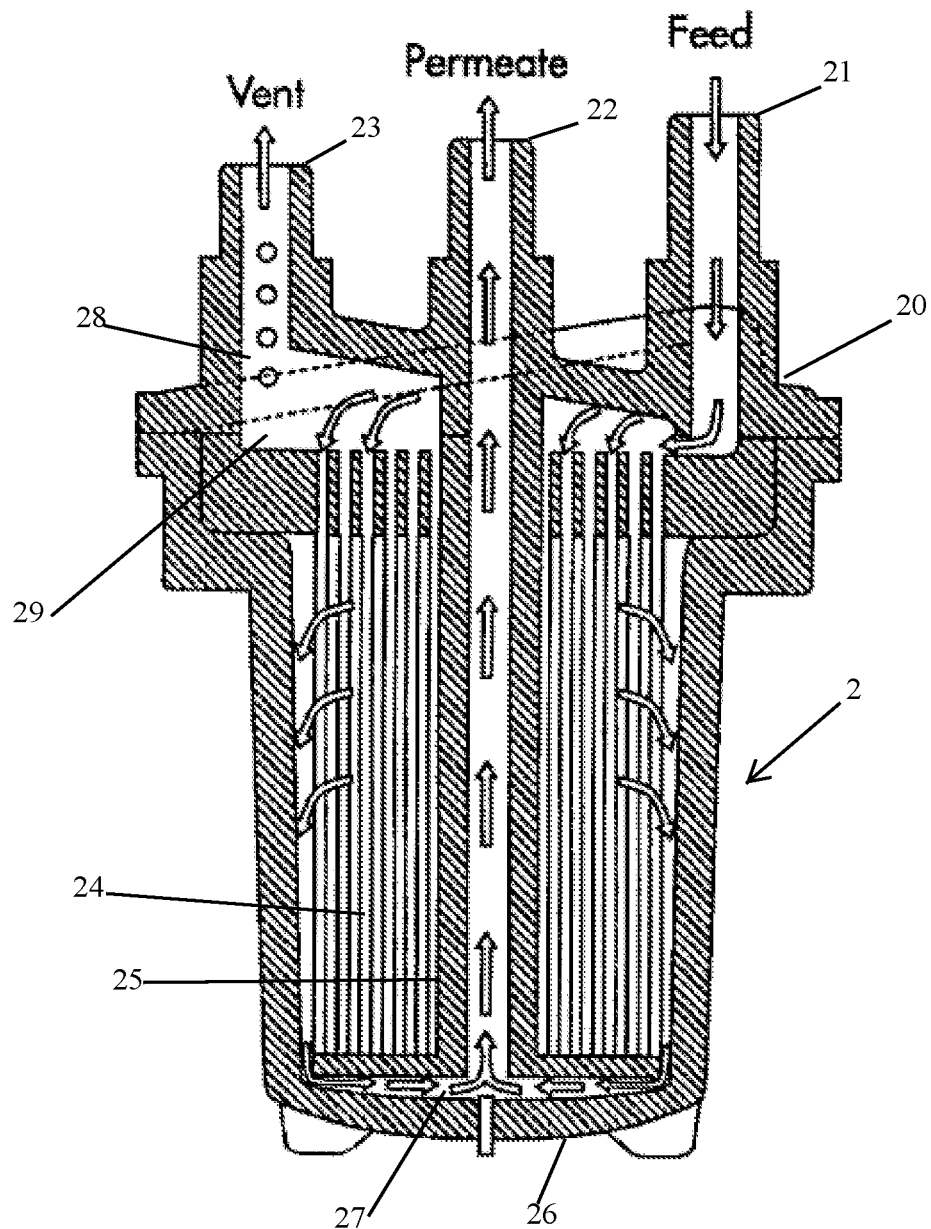
FIG. 1B is a cross-sectional side view of a dead-ended fluid separation module according to this disclosure, and shows a fluid separation module wherein a first end of a hollow fiber bundle is open and a second end of the hollow fiber bundle is sealed and fluid permeates from the lumen of each hollow fiber to outside of each hollow fiber.

In some aspects of a fluid separation module, the first end of a polyamide hollow fiber bundle is open such that the lumen volume communicates with the end of the polyamide hollow fiber bundle and the second end of the polyamide hollow fiber bundle is sealed. FIG. 1A and FIG. 1B are cross-sectional side views of a dead-ended fluid separation module wherein a first end of a polyamide hollow fiber bundle is open and a second end of the polyamide hollow fiber bundle is sealed. Fluid permeates from outside of each hollow fiber into the lumen of each hollow fiber in the module depicted in FIG. 1A. Fluid permeates from the lumen of each hollow fiber to outside of each hollow fiber in the module depicted in FIG. 1B. Hollow fiber bundles having an open first end and a sealed second end are also referred to herein as "single-ended" hollow fiber bundles.

A dead-ended fluid separation module has two fluid streams, feed and permeate, and, therefore, requires at least a feed port and a permeate port. Typically, a third port is used to provide venting to the feed stream when the feed stream is a liquid to prevent air from becoming trapped upstream of the membrane, thereby obstructing fluid flow. The fluid introduced into the feed port can be collected at the permeate port.

Referring now to FIG. 1A, the housing of fluid separation module 1 includes shell 16, end cap 10, vent port 11, feed port 12 and permeate port 13. Separation element 14 is positioned within the housing and comprises a plurality or bundle of single-ended polyamide hollow fiber membranes. A feed stream is introduced into feed port 12, which is connected to central conduit 15, which directs the feed stream to feed chamber 17 at the bottom end of module 1. From feed chamber 17, the feed stream is distributed across the cross-section of module 1 and reverses direction, flowing up and around separation element 14. The feed stream permeates separation element 14 and the resulting permeate stream passes into permeate chamber 19 and exits module 1 through permeate port 13. In the embodiment depicted in FIG. 1A, shell 16 is fusion bonded to end cap 10 and the feed stream permeates from outside of each hollow fiber into the lumen of each hollow fiber. Gas to be vented can collect in chamber 18 for venting through port 11.

In FIG. 1B, a feed stream is introduced into feed port 21. The feed stream permeates separation element 24 and the resulting permeate stream passes into permeate chamber 27. From there, the permeate stream flows up central conduit 25 to permeate port 22, where it exits fluid separation module 2. In the embodiment depicted in FIG. 1B, shell 26 is fusion bonded to end cap 20 and the feed stream permeates from the lumen of each hollow fiber to outside of each hollow fiber. Gas to be vented can collect in chamber 28 for venting through port 23.

Figure 1C:
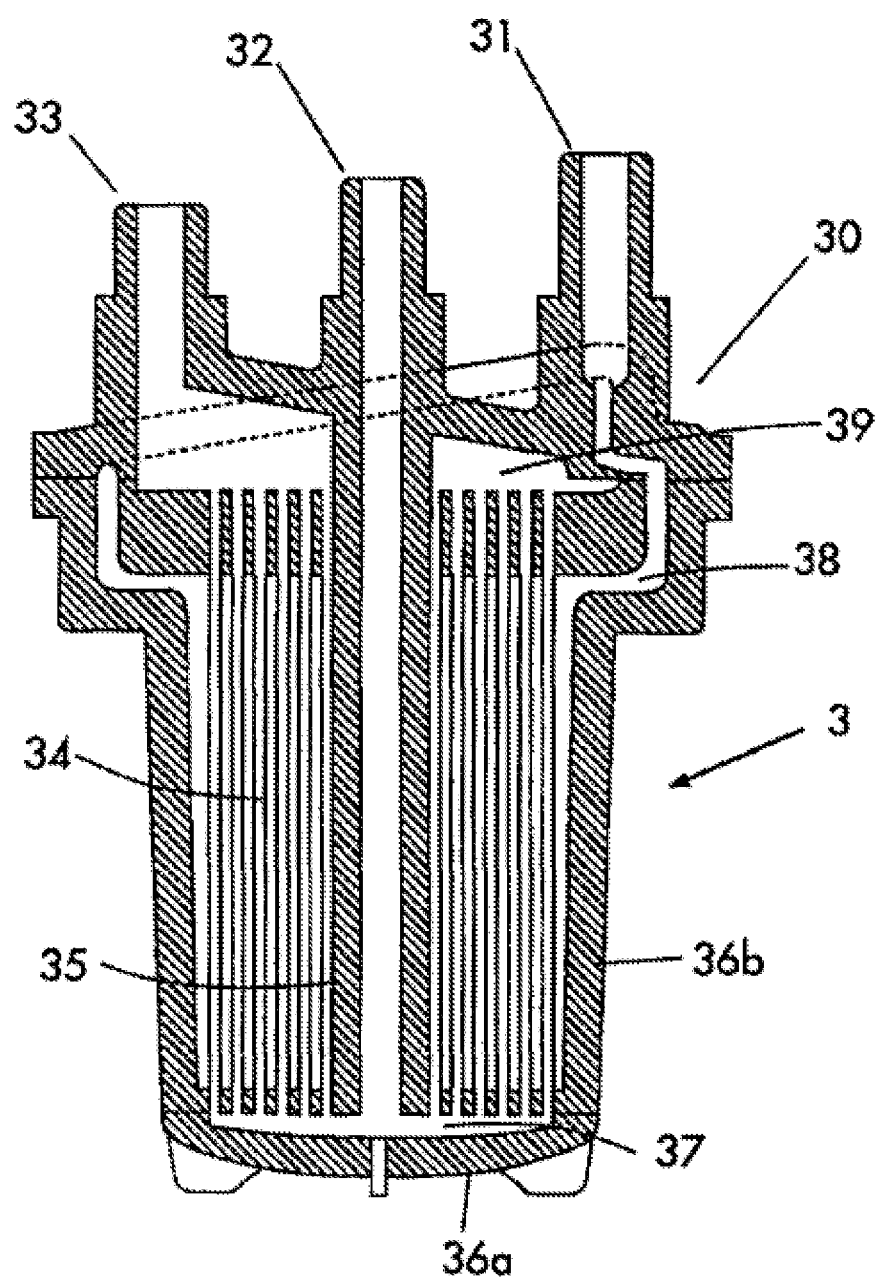
FIG. 1C is a cross-sectional side view of a tangential flow filtration (TFF) fluid separation module according to this disclosure, and shows a fluid separation module wherein first and second ends of a hollow fiber bundle are open.

In some aspects of a fluid separation module, a first end and a second end of a polyamide hollow fiber bundle are open. FIG. 1C is a cross-sectional side view of a tangential flow filtration (TFF) fluid separation module wherein first and second ends of the hollow fiber bundle are open. Hollow fiber bundles having open first and second ends such that the lumen volume communicates with both ends of the hollow fiber bundles are also referred to herein as "double-ended" hollow fiber bundles.

A TFF fluid separation module typically has three streams, feed, permeate and retentate, and, therefore, at least a feed port, a permeate port and a retentate port. Sometimes, a fourth port is used to drain the module. Typically, a drain is inactive during operation of the module. In a TFF fluid separation module, only a fraction of the feed flow is filtered, and this fraction can be collected at the permeate port; the balance of the feed flow can be collected upstream of the separation element at the retentate port.

The housing of the TFF fluid separation module comprises top end cap 30, bottom end cap 36a, cylindrical shell 36b and ports 31, 32, 33. Separation element 34 is positioned within the housing and comprises a double-ended polyamide hollow fiber bundle. The TFF fluid separation module depicted in FIG. 1C can be used in at least two configurations. In a first configuration, a feed stream permeates from outside of each hollow fiber into the lumen of each hollow fiber. In the first configuration, a feed stream enters fluid separation module 3 through central port 32, which is connected to central conduit 35, which directs the feed stream to the bottom end of module 3 to chamber 37. From there, the feed stream is distributed across the cross-section of module 3 and reverses direction, flowing upwardly and into the lumens of the hollow fibers. A fraction of the feed stream permeates separation element 34, and the resulting permeate stream passes into chamber 38 and exits module 3 through port 31. The remaining fraction of the feed stream flows upwardly through the lumen of the hollow fibers and the resulting retentate stream passes into chamber 39 and exits module 3 through port 33.

In a second configuration, a feed stream permeates from the lumen to outside of each hollow fiber in the TFF fluid separation module of FIG. 1C. In the second configuration, a feed stream enters fluid separation module 3 through port 33. A fraction of the feed stream permeates separation element 34 and the resulting permeate stream passes into chamber 38 and exits module 3 from port 31. The remaining fraction of the feed stream flows downwardly along the lumen of the hollow fibers and the resulting retentate stream passes into chamber 37. From there, the retentate stream reverses direction and flows upwardly through central conduit 35, exiting module 3 at central port 32.

Also provided herein is a process for producing a polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm. The process comprises forming a slurry of polyamide resin and water-soluble organic solvent. The slurry is extruded through a hollow fiber spinneret into water that is maintained at a temperature sufficient to induce coagulation of the slurry to form a hollow fiber. The water-soluble organic solvent is extracted from the hollow fiber using water to form the hollow fiber membrane. The hollow fiber or hollow fiber membrane is wound onto a compressible frame. The hollow fiber membrane is dried on the compressible frame, thereby producing the polyamide hollow fiber membrane open to fluid flow.

The slurry typically comprises from about 15% to about 25% polyamide resin by mass or about 20% polyamide resin by mass.

As used herein, "water-soluble organic solvent" refers to any organic compound or mixture of organic compounds that dissolves in water, dissolves polyamide resin at a temperature higher than about 100° C. and is insoluble with the polyamide resin at a temperature lower than about 100° C. Exemplary water-soluble organic solvents include, but are not limited to, polyvalent alcohols (e.g., diglycerol, glycerol, ethylene glycol, diethylene glycol), cyclic lactones (e.g., butyrolactone, valerolactone, caprolactone) and cyclic amides (e.g., caprolactam) and mixtures of any of the foregoing. In some aspects, the water-soluble organic solvent is diglycerol, glycerol, glycol, diglycol, glyceryl monoacetate, caprolactam or butyrolactone, or a mixture of any of the foregoing. In one aspect of the disclosure, the water-soluble organic solvent is diglycerol.

The slurry typically comprises from about 50% by mass to about 85% by mass, from about 60% by mass to about 75% by mass or about 68% by mass water-soluble organic solvent (e.g., diglycerol). In one aspect of the disclosure, the slurry comprises from about 65% by mass to about 70% by mass water-soluble organic solvent.

In some aspects, the slurry further comprises a water-soluble organic non-solvent. Accordingly, provided herein is a process for producing a polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm. The process comprises forming a slurry of polyamide resin, water-soluble organic solvent and water-soluble organic non-solvent. The slurry is extruded through a hollow fiber spinneret into water that is maintained at a temperature sufficient to induce coagulation of the slurry to form a hollow fiber. The water-soluble organic solvent and the water-soluble organic non-solvent are extracted from the hollow fiber using water to form the hollow fiber membrane. The hollow fiber or hollow fiber membrane is wound onto a compressible frame. The hollow fiber membrane is dried on the compressible frame, thereby producing the polyamide hollow fiber membrane open to fluid flow.

As used herein, "water-soluble organic non-solvent" refers to any organic compound or mixture of organic compounds that dissolves in water and is insoluble with polyamide resin. Exemplary water-soluble organic non-solvents include, but are not limited to, polyvalent alcohols (e.g., triethylene glycol, polyethylene glycol, particularly polyethylene glycols having a molecular weight of from about 100 to about 600) and glycerol triacetate, and mixtures of any of the foregoing. In some aspects, the water-soluble organic non-solvent is polyethylene glycol (e.g., polyethylene glycol having a molecular weight of from about 100 to about 600), triethylene glycol or glycerol triacetate, or a mixture of any of the foregoing. In one aspect of the disclosure, the water-soluble organic non-solvent is polyethylene glycol having a molecular weight of from about 100 to about 600.

When the slurry includes water-soluble organic non-solvent, the slurry typically comprises from about 5% by mass to about 25% by mass water-soluble organic non-solvent (e.g., polyethylene glycol). In one aspect of the disclosure, the slurry comprises from about 10% by mass to about 15% by mass water-soluble organic non-solvent.

The temperature of the water maintained at a temperature sufficient to induce coagulation of the slurry to form a hollow fiber can be lower than about 100° C., lower than about 75° C., lower than about 50° C., lower than about 30° C., about room temperature (e.g., from about 25° C. to about 30° C. or about 28° C.) or about 10° C. For example, the temperature of the water maintained at a temperature sufficient to induce coagulation of the slurry to form a hollow fiber can be from about 0° C. to about 100° C., from about 0° C. to about 75° C., from about 0° C. to about 50° C., from about 0° C. to about 30° C. or from about 0° C. to about 15° C.

The water used for extracting the water-soluble organic solvent and the water-soluble organic non-solvent, if present, is maintained at a temperature sufficient to dissolve or substantially dissolve the water-soluble organic solvent and the water-soluble organic non-solvent, if present. In some embodiments, the temperature of the water used for extracting is greater than about 25° C., for example, greater than about 30° C., greater than about 50° C., such as about 80° C. In some embodiments, the temperature of the water used for extracting is from about 30° C. to about 130° C., from about 45° C. to about 100° C. or from about 75° C. to about 100° C. The temperature of the water used for extracting should be less than a temperature that melts or induces deformation of the hollow fiber or the resulting hollow fiber membrane.

During extraction and drying, hollow fibers and hollow fiber membranes have a propensity to shrink. If a fiber or membrane is constrained during extraction and/or drying, as it is when wound onto a rigid frame, the fiber or membrane can collapse and lose its round shape, which can affect its strength and permeability. If a fiber or membrane is not constrained, however, the fiber or membrane can shrink uncontrollably, which can significantly decrease its permeability. A compressible frame disclosed in embodiments herein can be used to control the extent of shrinkage during extraction and/or drying while maintaining the openness or round shape of the fiber or membrane. In some aspects of the methods disclosed herein, the hollow fiber is wound onto the compressible frame, then the water-soluble organic solvent is extracted from the hollow fiber and the hollow fiber membrane is dried.

In embodiments of the disclosure, a hollow fiber or hollow fiber membrane can be wound onto a compressible frame such that the wound fiber or membrane shrinks along its length as the frame compresses. In some embodiments, a hollow fiber or hollow fiber membrane is wound onto a compressible frame such that the wound hollow fiber or hollow fiber membrane can shrink along a length of the hollow fiber or hollow fiber membrane as the compressible frame compresses. In the compressible frame depicted in FIG. 3A, the hollow fiber or hollow fiber membrane is wound onto the compressible frame such that the fiber or membrane is parallel or substantially parallel to the axis along which the frame compresses, denoted in FIG. 3A as height (h) of compressible frame 5.

"Compressible frame," as used herein, refers to an apparatus for extracting and/or drying hollow fibers or hollow fiber membranes that compresses as a hollow fiber or hollow fiber membrane wound onto the frame shrinks along its length. In the compressible frame depicted in FIGS. 2A-2C, for example, a hollow fiber or hollow fiber membrane is wound onto a frame (e.g., a stainless steel frame) such that an elastomeric bulb seal gasket positioned along an edge of the frame compresses as the wound fiber or membrane shrinks along its length. In the compressible frame depicted in FIGS. 3A-3C, a spring facilitates compression of the compressible frame as the wound fiber or membrane shrinks along its length.

Figures 2A, 2B:
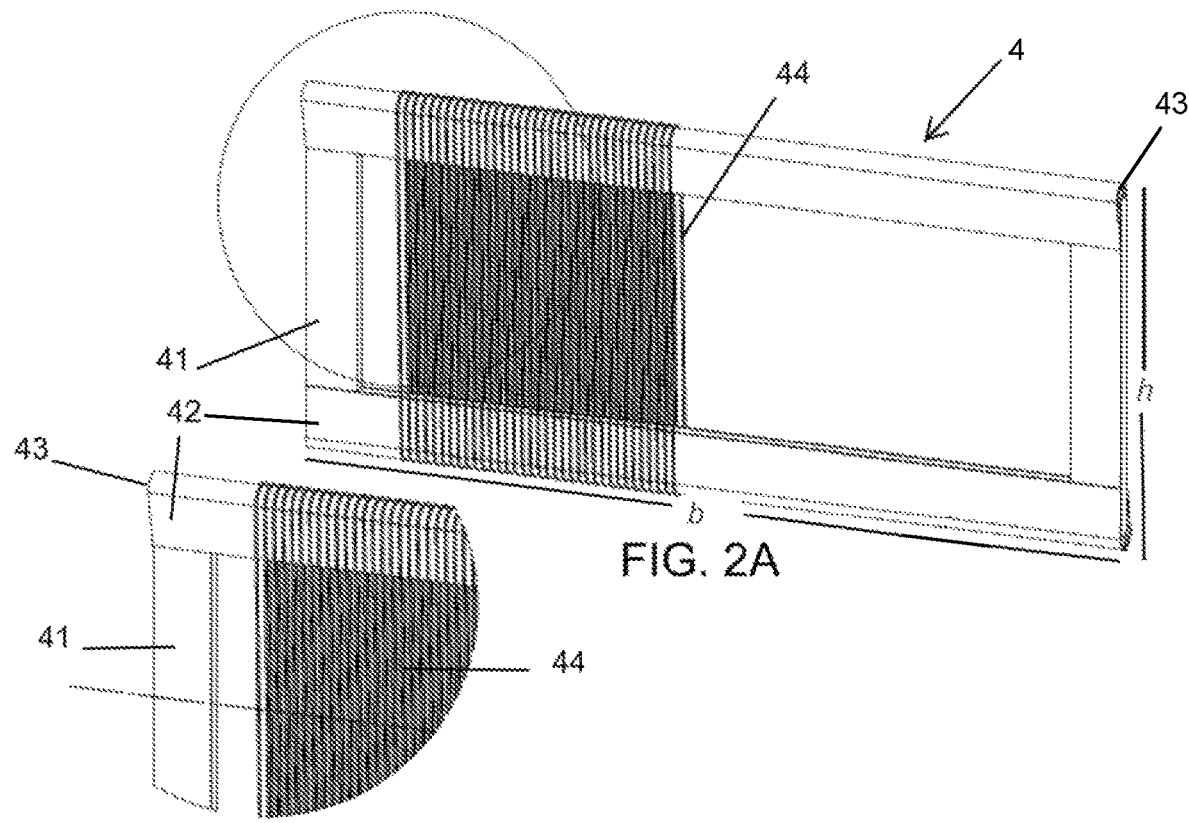
FIG. 2A is a schematic diagram of a compressible frame comprising a rectangular stainless steel frame and an elastomeric bulb seal gasket positioned over the bases (b) of the rectangular stainless steel frame, and shows a hollow fiber or hollow fiber membrane wound onto the frame and elastomeric bulb seal gasket wherein shrinkage of the hollow fiber or hollow fiber membrane along its length causes compression of the bulb seal.
FIG. 2B is a close-up view of the encircled portion of the compressible frame depicted in FIG. 2A.
Figure 2C:
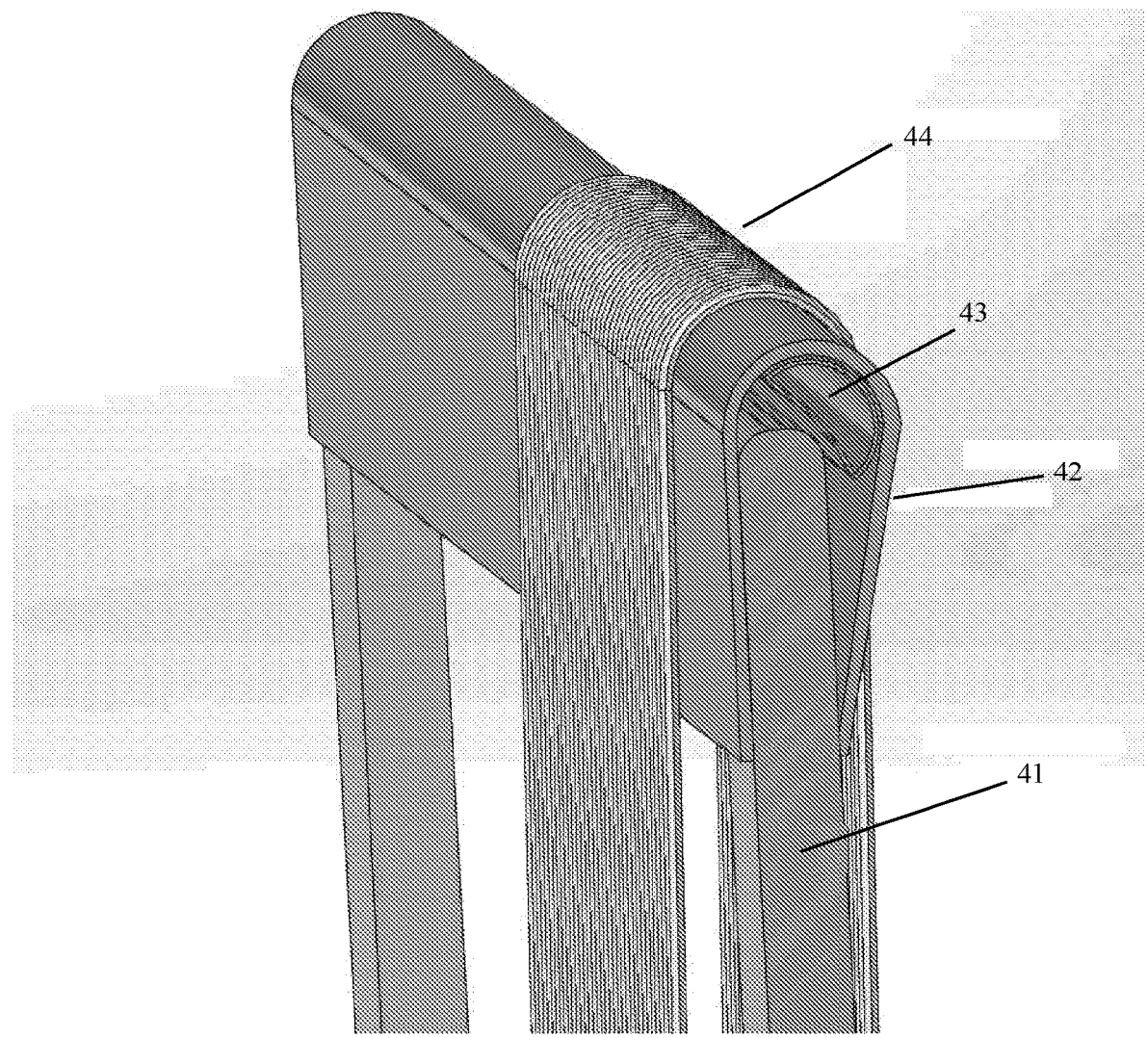
FIG. 2C is a side view of a portion of the compressible frame depicted in FIG. 2A.

FIG. 2A is a schematic diagram of compressible frame 4 comprising rectangular stainless steel frame 41 and elastomeric bulb seal gaskets 42 positioned over bases b of rectangular stainless steel frame 41. Hollow fiber or hollow fiber membrane 44 is wound around frame 41 and elastomeric bulb seal gaskets 42 such that shrinkage of hollow fiber or hollow fiber membrane 44 along its length causes compression of bulb 43. FIG. 2B is a close-up view of the encircled portion of the compressible frame depicted in FIG. 2A, and FIG. 2C is a side view of a portion of the compressible frame depicted in FIG. 2A.

Figures 3A, 3B:
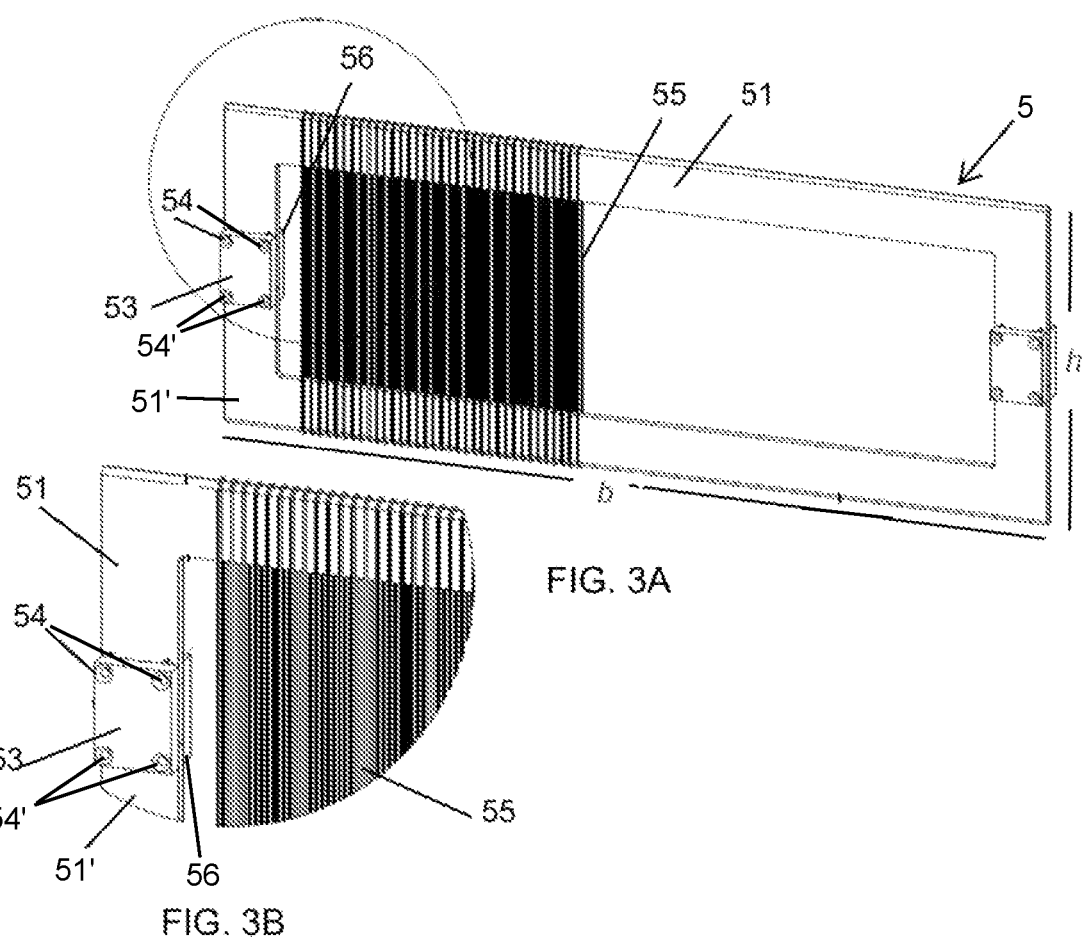
FIG. 3A is a schematic diagram of a compressible frame comprising a rectangular stainless steel frame made from two components movable relative to one another at a joint formed by spring guides and a compressive spring, and shows a hollow fiber or hollow fiber membrane wound onto the compressible frame such that compression of the frame along its height (h) is caused by shrinkage of the hollow fiber or hollow fiber membrane along its length.
FIG. 3B is a close-up view of the encircled portion of the compressible frame depicted in FIG. 3A.
Figure 3C:
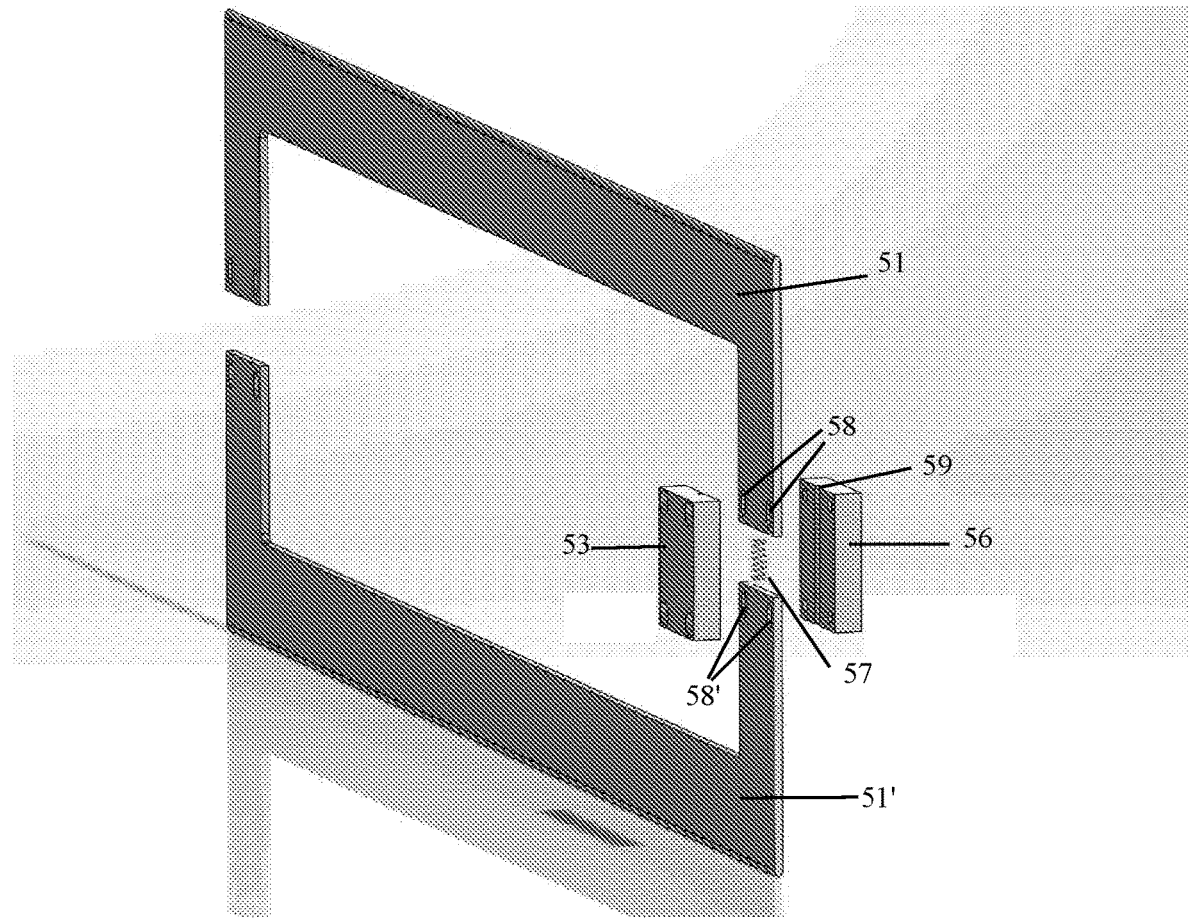
FIG. 3C is an exploded side view of the compressible frame depicted in FIG. 3A.

FIG. 3A is a schematic diagram of compressible frame 5 comprising a rectangular stainless steel frame made from two components 51, 51' movable relative to one another at a joint formed by bracket 53, bracket 56 and screws 54, 54' in cooperation with spring guides 58, 58' (shown in FIG. 3C) and compressive spring 57 (shown in FIG. 3C). In operation, compressive spring 57 resides in channel 59 in bracket 56 (shown in FIG. 3C) and a corresponding channel (not shown) in bracket 53. Screws 54 pass from bracket 53 through spring guides 58 in component 51 into bracket 56 and screws 54' pass from bracket 53 through spring guides 58' in component 51' into bracket 56, thereby securing the movable joint. Hollow fiber or hollow fiber membrane 55 is wound around frame 5 such that shrinkage of the hollow fiber or hollow fiber membrane along its length causes compression of the frame along its height (h). FIG. 3B is a close-up view of the encircled portion of the compressible frame depicted in FIG. 3A. FIG. 3C is an exploded side view of the compressible frame with the substantially identical components 51 and 51' depicted in FIG. 3A which shows one pair of brackets 53 and 56 with spring channel 59 and spring 57 for forming a movable joint (the second movable joint brackets and spring have been omitted for clarity).

Components 51, 51' in FIGS. 3A-3C are identical, or in some embodiments substantially identical, to one another. However, other configurations of components 51, 51' that allow for frame compression along height h of frame 5 can be contemplated and are within the scope of this disclosure. Although base b of frames 4 and 5 is depicted in FIGS. 2A and 3A as longer than height h, base b could also be shorter than or equal to (as in a square frame) height h.

As used herein with respect to a membrane, "dry" means that the membrane is free or substantially free from moisture or liquid. "Drying" means to cause a membrane or to allow a membrane to become dry, as that term is described. It will be understood that nylon is a hygroscopic material. In some embodiments, drying a hollow fiber membrane includes drying the hollow fiber membrane until the hollow fiber membrane is at least dry to the touch. Drying includes both air-drying (e.g., at room temperature) and applying heat to or heating a membrane, which can speed removal of moisture or liquid from a hollow fiber membrane. It will be understood that when heating is used to dry a membrane, heating times and temperatures should be controlled so as not to melt or deform the hollow fiber membrane.

Also provided herein is a polyamide hollow fiber membrane open to fluid flow and having an isopropanol permeability of from about 5 L/m² h bar to about 150 L/m² h bar and a particle rejection percentage of about 100% for particles having a nominal diameter of from about 1 nm to about 25 nm. The polyamide hollow fiber membrane is prepared according to a process comprising forming a slurry of polyamide resin and water-soluble organic solvent, extruding the slurry through a hollow fiber spinneret into water maintained at a temperature sufficient to induce coagulation of the slurry to form a hollow fiber, and extracting the water-soluble organic solvent from the hollow fiber using water to form the hollow fiber membrane. The hollow fiber or hollow fiber membrane is wound onto a compressible frame. The hollow fiber membrane is dried on the compressible frame, thereby producing the polyamide hollow fiber membrane open to fluid flow. Variations in the method and the characteristics of the hollow fiber membrane (e.g., permeability, MBP, particle rejection) are as described herein.

When the slurry does not include a water-soluble organic non-solvent, the resulting hollow fiber membrane typically has an isopropanol permeability of from about 5 L/m² h bar to about 30 L/m² h bar. The mean bubble point of a hollow fiber membrane produced according to a process in which the slurry does not include a water-soluble organic non-solvent is typically from about 90 psi to about 150 psi.

When the slurry includes a water-soluble organic non-solvent, the resulting hollow fiber membrane typically has an isopropanol permeability of from about 10 L/m² h bar to about 150 L/m² h bar, for example, from about 40 L/m² h bar to about 100 L/m² h bar. The mean bubble point of a hollow fiber membrane produced according to a process in which the slurry includes a water-soluble organic non-solvent is typically from about 50 psi to about 120 psi, for example, from about 70 psi to about 95 psi.

EXEMPLIFICATION

Example 1. Preparation of a Potted Hollow Fiber Loop

A hollow fiber membrane was cut to a length of 10 cm. The two ends of the hollow fiber were inserted into a ¼-inch OD plastic tube, which was 3 cm long, to form a loop with the hollow fiber. Hot melt adhesive, such as that used in glue guns for crafts, was inserted into the plastic tube from the side of the cut fiber ends until the tube was filled. Once hot melt adhesive had cooled, about 0.5 cm was cut off the end of the tube to reveal a cross section of the hollow fiber.

Example 2. Determination of Mean Bubble Point (MBP)

Air was pressurized through the lumen of a potted hollow fiber loop prepared as described in Example 1 and the air flow was measured as a function of pressure. The loop was then submerged in a low surface tension fluid, HFE-7200 (3M Novec Engineered Fluid HFE-7200), and air was pressurized through the lumen of the fiber. The air flow was again measured as a function of pressure. The mean bubble point (MBP) is the pressure at which the ratio of the air flow of the wet fiber and the air flow of the dry fiber is 0.5.

Example 3. Determination of Isopropanol Permeability

Figure 4:
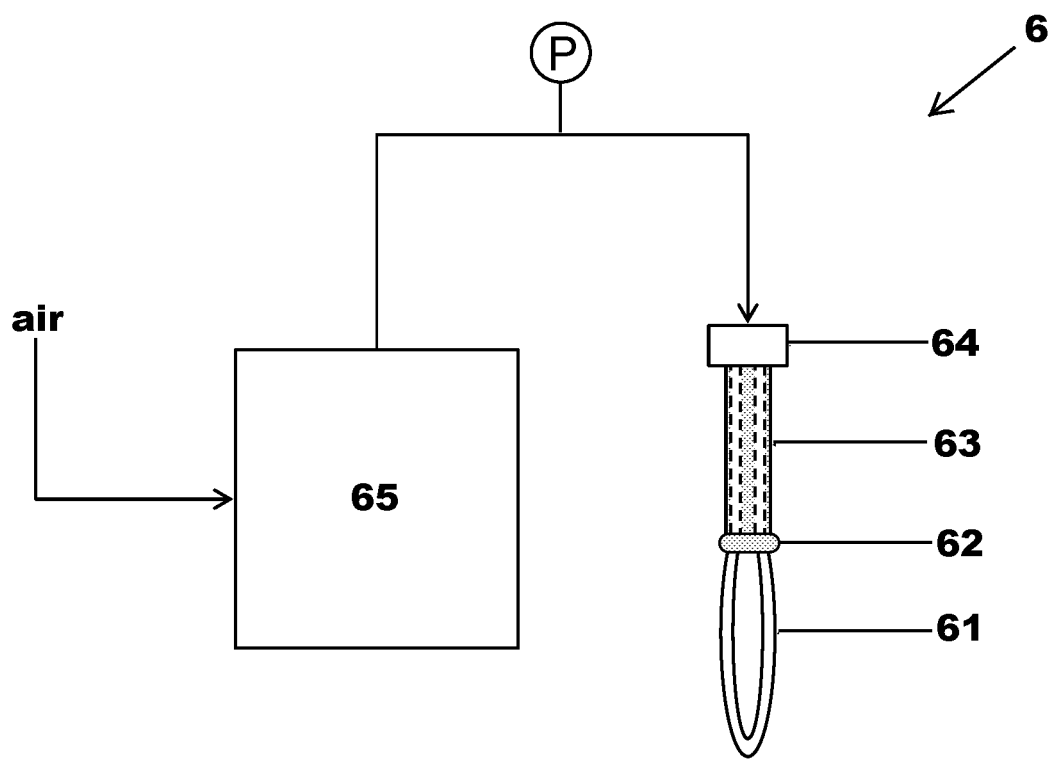
FIG. 4 is a schematic of the isopropanol permeability internal flow test apparatus.

An internal flow test was used to determine isopropanol permeability using a potted hollow fiber loop prepared according to Example 1. FIG. 4 is a schematic of isopropanol permeability internal flow test apparatus 6, which includes pressurized tank 65 containing isopropanol plumbed to hollow fiber membrane 61 potted in tube 63 with hot melt adhesive 62. To perform the internal flow test, tube 63 was inserted into push-to-connect fitting 64 and isopropanol was fed from pressurized tank 65 through hollow fiber 61 at 14.2 psi for a predetermined interval at a temperature of 22° C. The isopropanol flowing through the membrane was collected and measured. Isopropanol permeability was calculated from Equation 1.

Example 4. Determination of Particle Retention

G25 Particles: Particle retention of a potted hollow fiber loop prepared according to Example 1 was measured by passing a sufficient amount of an aqueous feed solution of 0.1% Triton X-100, adjusted to pH 9 and containing 8 ppm polystyrene particles having a nominal diameter of 0.03 microns (available from Duke Scientific G25B), to achieve 1% monolayer coverage through a hollow fiber membrane at a pressure of 15 psi, and collecting the filtrate through the lumen. The concentration of the polystyrene particles in the filtrate was calculated from the absorbance of the filtrate. Particle retention was then calculated from the Equation 3:

$$\text{Particle Retention} = ([\text{feed}] - [\text{filtrate}])/[\text{feed}] \times 100\% \quad (3).$$

Gold Particles: 5 nm gold particles (available from Ted Pella) in propylene glycol monomethyl ether were substituted for G25 particles in 0.1% Triton X-100 in the procedure described above for determining retention of G25 particles. The concentration of gold particles in the filtrate was determined by inductively coupled plasma mass spectrometry (ICP-MS).

Example 5

A slurry comprising 20% polyamide 6 powder (DSM Akulon F136E2, cryoground to a fine powder), 68% diglycerol, and 12% polyethylene glycol 600 was fed into a 3-zone co-rotating twin screw extruder at 220° C. to 240° C. and pumped into a hollow fiber die at 190° C. A solution of 75% diglycerol and 25% polyethylene glycol 600 was preheated to 110° C. and pumped into the lumen. The combined extrudate and lumen fluid passed through an air gap of about 3 cm before being cooled in a water bath at about 28° C., at which point the hollow fiber membrane was formed. The fiber was taken up by a Godet roller at 120 feet per minute (fpm) and collected onto a roll. The fiber was wrapped around the compressible frame depicted in FIGS. 2A-2C and extracted in a water bath at 80° C. overnight, air-dried for 2 hours, then dried in an oven at 80° C. for 1 hour.

The resultant fiber had a MBP of 89 psi and isopropanol permeability of 68 L/m² h bar. The G25 particle retention at 1% monolayer coverage was 100%. The 5 nm gold particle retention at 1% monolayer coverage was 100%.

Example 6

A hollow fiber membrane was produced in the same manner as in Example 5 except that the fiber was wrapped around the compressible frame depicted in FIGS. 3A-3C prior to extraction in the hot water bath. The resultant fiber had a MBP of 86 psi and isopropanol permeability of 81 L/m² h bar.

Example 7

Polyamide 6 pellets (EMS Grilon F50) were fed into a 3-zone single screw extruder at 220-230° C. The hot extrudate was subsequently fed into a 3-zone co-rotating twin screw extruder at 200-220° C., simultaneously with a mixture comprising 95% diglycerol and 5% polyethylene glycol 600, at a feed rate to achieve 20% polyamide 6. The mixture was pumped through the hollow fiber die at 190° C., concurrently with a solution of 75% diglycerol and 25% polyethylene glycol 600 preheated to 110° C. through the lumen, and cooled in a water bath at 27° C., with an air gap of 1.5 cm. The fiber was taken up by a Godet roller at 120 fpm and collected onto a roll. The fiber was wrapped around the compressible frame depicted in FIGS. 2A-2C and extracted in a water bath at 80° C. overnight, air-dried for 2 hours, then dried in an oven at 80° C. for 1 hour.

The resultant fiber had a MBP of 76 psi and isopropanol permeability of 58 L/m² h bar. The G25 particle retention at 1% monolayer coverage was 100%.

Example 8

A hollow fiber membrane was produced in the same manner as Example 7 except with polyamide pellets (BASF Ultramid B40) processed through the single screw extruder at 240-250° C., which was fed into the twin screw extruder at 200-260° C. simultaneously with a mixture of 75% diglycerol and 25% polyethylene glycol 600 at a feed rate to achieve 20% polyamide 6. The resultant fiber had a MBP of 74 psi and isopropanol permeability of 32 L/m² h bar. The G25 particle retention at 1% monolayer coverage was 100%.

Example 9

A hollow fiber membrane was produced in the same manner as Example 8 except with polyamide pellets (DSM Akulon F136E2). The resultant fiber had a MBP of 89 psi and isopropanol permeability of 68 L/m² h bar. The G25 particle retention at 1% monolayer coverage was 100%.

Example 10

Hollow fiber membrane from Example 5 was used to make a filtration module. Using the spiral lamination process of U.S. Provisional Appln. No. 62/190,617, ~1000 fibers were potted with 90% HDPE/10% maleic anhydride-grafted polyethylene (Dow DMDA8965NT, Two H Chem HFS2100). The bundle was mounted on a lathe to remove excess potting material and fibers to reveal the cross-section of the hollow fibers open to fluid flow. One end of the bundle was then sealed by capping with a polyethylene disc. The bundle was then bonded into the housing of FIG. 1. The G25 particle retention at 1% monolayer was 100%.

Comparative Example 1

A hollow fiber membrane was produced in the same manner as in Example 5 except that the fiber was wrapped around an incompressible stainless steel frame prior to extraction in the hot water bath. The resultant fiber was mildly collapsed, having an oblong rather than round shape. It did not have sufficient strength to be tested for bubble point or permeability.

Comparative Example 2

A commercially available flat polyamide membrane was tested. It had a MBP of 119 psi and permeability of 674 L/m² h bar. The G25 particle retention at 1% monolayer coverage was 79%.

The teachings of all patents, published applications and references cited herein are incorporated by reference in their entirety.

Although various embodiments have been shown and described with respect to one or more implementations, equivalent alterations and modifications will occur to others skilled in the art based upon a reading and understanding of this specification and the annexed drawings. The embodiments include all such modifications and alterations and is limited only by the scope of the following claims. In addition, while a particular feature or aspect of an embodiment may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present embodiments have been described in considerable detail with reference to certain versions thereof, other versions are possible. Therefore the spirit and scope of the appended claims should not be limited to the description and the versions contained within this specification.

The following clauses define particular aspect and embodiments of the invention.

Clause 1. A polyamide hollow fiber membrane, having an isopropanol permeability of from about 5 $L/m^2$ h bar to about 150 $L/m^2$ h bar and a particle rejection percentage of about 100% for particles having a nominal diameter of from about 1 nm to about 25 nm.

Clause 2. The polyamide hollow fiber membrane of clause 1, wherein the isopropanol permeability is from about 40 $L/m^2$ h bar to about 100 $L/m^2$ h bar.

Clause 3. The polyamide hollow fiber membrane of clause 1, wherein the isopropanol permeability is from about 5 $L/m^2$ h bar to about 30 $L/m^2$ h bar.

Clause 4. The polyamide hollow fiber membrane of any one of clauses 1-3, wherein the particle rejection percentage is about 100% for particles having a nominal diameter of from about 5 nm to about 25 nm.

Clause 5. The polyamide hollow fiber membrane of any one of clauses 1-4, wherein the mean bubble point is from about 50 psi to about 150 psi.

Clause 6. The polyamide hollow fiber membrane of clause 5, wherein the mean bubble point is from about 70 psi to about 95 psi.

Clause 7. The polyamide hollow fiber membrane of clause 5, wherein the mean bubble point is from about 90 psi to about 150 psi.

Clause 8. The polyamide hollow fiber membrane of any one of clauses 1-7, wherein the polyamide is polyamide 6, polyamide 6,6, polyamide 4,6, polyamide 6,10 or polyamide 12, or a combination of any of the foregoing.

Clause 9. The polyamide hollow fiber membrane of clause 8, wherein the polyamide is polyamide 6.

Clause 10. The polyamide hollow fiber membrane of any one of clauses 1-9, wherein the outer diameter of the hollow fiber membrane is from about 400 microns to about 1,000 microns and the inner diameter of the hollow fiber membrane is from about 200 microns to about 800 microns.

Clause 11. The polyamide hollow fiber membrane of any one of clauses 1-10, wherein the hollow fiber membrane has a thickness of from about 100 microns to about 250 microns.

Clause 12. A fluid separation module, comprising:
a housing having a feed port and a permeate port; and
a separation element positioned within the housing dividing the housing into a first volume and a second volume fluidly sealed from the first volume, the separation element comprising a plurality of polyamide hollow fiber membranes, each polyamide hollow fiber membrane having a first end portion and a second end portion, a lumen that is open to fluid flow and an isopropanol permeability of from about 5 $L/m^2$ h bar to about 150 $L/m^2$ h bar and a particle rejection percentage of about 100% for particles having a nominal diameter of from about 1 nm to about 25 nm,
wherein the feed port is in fluid communication with the first volume and the permeate port is in fluid communication with the second volume,
whereby at least a fraction of fluid fed into the feed port permeates the plurality of polyamide hollow fiber membranes and thereby forms a permeate, which flows out of the permeate port.

Clause 13. The filtration cartridge of clause 12, wherein the first end portion of each of the plurality of hollow fiber membranes is potted and the second end portion of each of the plurality of hollow fiber membranes is potted to form a polyamide hollow fiber bundle.

Clause 14. The filtration cartridge of clause 13, wherein the polyamide hollow fiber bundle is a double-ended polyamide hollow fiber bundle.

Clause 15. The filtration cartridge of clause 13, wherein the polyamide hollow fiber bundle is a single-ended polyamide hollow fiber bundle.

Clause 16. A polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm, prepared according to a process comprising:
forming a slurry of polyamide resin and water-soluble organic solvent;
extruding the slurry through a hollow fiber spinneret into water maintained at a temperature sufficient to induce coagulation of the slurry to form a hollow fiber;
extracting the water-soluble organic solvent from the hollow fiber using water to form the hollow fiber membrane;
winding the hollow fiber or hollow fiber membrane onto a compressible frame; and
drying the hollow fiber membrane on the compressible frame, thereby producing the polyamide hollow fiber membrane open to fluid flow.

Clause 17. A process for producing a polyamide hollow fiber membrane open to fluid flow and having an isopropanol permeability of from about 5 $L/m^2$ h bar to about 150 $L/m^2$ h bar and a particle rejection percentage of about 100% for particles having a nominal diameter of from about 1 nm to about 25 nm, the process comprising:

forming a slurry of polyamide resin and water-soluble organic solvent;

extruding the slurry through a hollow fiber spinneret into water maintained at a temperature sufficient to induce coagulation of the slurry to form a hollow fiber;

extracting the water-soluble organic solvent from the hollow fiber using water to form the hollow fiber membrane;

winding the hollow fiber or hollow fiber membrane onto a compressible frame; and drying the hollow fiber membrane on the compressible frame, thereby producing the polyamide hollow fiber membrane open to fluid flow.

Clause 18. The process of clause 17, wherein the slurry comprises from about 15% to about 25% polyamide resin by mass.

Clause 19. The process of clause 18, wherein the slurry comprises about 20% polyamide resin by mass.

Clause 20. The process of any one of clauses 17-19, wherein the polyamide resin is polyamide 6.

Clause 21. The process of any one of clauses 17-20, wherein the water-soluble organic solvent is diglycerol.

Clause 22. The process of any one of clauses 17-21, wherein the slurry comprises from about 50% to about 85% water-soluble organic solvent by mass.

Clause 23. The process of clause 22, wherein the slurry comprises from about 65% to about 70% water-soluble organic solvent by mass.

Clause 24. The process of any one of clauses 17-23, wherein the slurry further comprises water-soluble organic non-solvent.

Clause 25. The process of clause 24, wherein the water-soluble organic non-solvent is polyethylene glycol.

Clause 26. The process of clause 24 or 25, wherein the slurry comprises from about 5% to about 25% water-soluble organic non-solvent by mass.

Clause 27. The process of clause 26, wherein the slurry comprises from about 10% to about 15% water-soluble organic non-solvent by mass.

Clause 28. The process of any one of clauses 17-27, wherein the hollow fiber is wound onto the compressible frame, then the water-soluble organic solvent is extracted from the hollow fiber and the hollow fiber membrane is dried.

Clause 29. The process of any one of clauses 17-28, wherein the hollow fiber or hollow fiber membrane is wound onto the compressible frame such that the wound hollow fiber or hollow fiber membrane can shrink along a length of the hollow fiber or hollow fiber membrane as the compressible frame compresses.

Clause 30. A compressible frame apparatus for extracting and/or drying hollow fibers or hollow fiber membranes, said frame adapted to compresses as hollow fiber or hollow fiber membrane wound onto the frame apparatus shrink along their length, said compressible frame comprising: a rectangular frame; elastomeric material positioned along opposing edges of the frame, said elastomeric material compresses as a wound hollow fiber or hollow fiber membrane shrinks along its length on the frame.

Clause 31. The compressible frame of clause 30 wherein the elastomeric material is a elastomeric bulb seal gasket positioned over the opposing edges of the frame.

Clause 32. The compressible frame apparatus of any one of clauses 30-31 wherein the elastomeric material is characterized a force constant that is sufficient to maintain the openness and prevent collapse of hollow fibers or hollow fiber membranes wound on said frame during drying or extraction of hollow fibers hollow fiber membranes wound onto said frame apparatus.

Clause 33. A compressible frame apparatus for extracting and/or drying hollow fibers or hollow fiber membranes that is adapted to compresses as hollow fiber or hollow fiber membrane wound onto the frame apparatus shrinks along its length, said compressible frame comprising: a rectangular frame made from a first component and a second component that are joined together by one or more brackets, the first component and the second component movable relative to one another at joints formed by the components and one or more brackets in cooperation with one or more spring guides and compressive springs, said rectangular frame compresses as a wound hollow fiber or hollow fiber membrane shrinks along its length on the frame.

Clause 34. The compressible frame apparatus of clause 33 wherein the first component and the second component are substantially identical to one another.

Clause 35. The compressible frame apparatus of any one of clauses 33-34 wherein the springs have a force constant that is sufficient to maintain the openness and prevent collapse of hollow fibers or hollow fiber membranes during drying or extraction of hollow fibers or hollow fiber membranes wound onto said frame apparatus.

Clause 36. The compressible frame apparatus as in any one of clauses 30-35 further comprising wherein the hollow fibers or hollow fiber membranes wound onto the compressible frame, and wherein said hollow fibers or hollow fiber membranes are comprised of a polyamide and have an OD of from about 400 microns to about 1000 microns and an ID of from about 200 microns to about 800 microns.

What is claimed is:

1. A polyamide hollow fiber membrane, having an isopropanol permeability of from about 5 L/m$^2$h bar to about 150 L/m$^2$h bar, a mean bubble point of from about 50 psi to about 150 psi as measured with HFE-7200, and a particle rejection percentage of about 100% for particles having a nominal diameter of from about 1 nm to about 25 nm after being wound onto and dried on a compressible frame.

2. The polyamide hollow fiber membrane of claim 1, wherein the isopropanol permeability is from about 40 L/m$^2$ h bar to about 100 L/m$^2$h bar.

3. The polyamide hollow fiber membrane of claim 1, wherein the isopropanol permeability is from about 5 L/m$^2$ h bar to about 30 L/m$^2$ h bar.

4. The polyamide hollow fiber membrane of claim 1, wherein the particle rejection percentage is about 100% for particles having a nominal diameter of from about 5 nm to about 25 nm.

5. The polyamide hollow fiber membrane of claim 1, wherein the mean bubble point is from about 70 psi to about 95 psi.

6. The polyamide hollow fiber membrane of claim 1, wherein the mean bubble point is from about 90 psi to about 150 psi.

7. The polyamide hollow fiber membrane of claim 1, wherein the polyamide is polyamide 6, polyamide 6,6, polyamide 4,6, polyamide 6,10 or polyamide 12, or a combination of any of the foregoing.

8. The polyamide hollow fiber membrane of claim 7, wherein the polyamide is polyamide 6.

9. The polyamide hollow fiber membrane of claim 1, having an outer diameter of from about 400 microns to about 1,000 microns and having an inner diameter of from about 200 microns to about 800 microns.

10. The polyamide hollow fiber membrane of claim 1, wherein the hollow fiber membrane has a thickness of from about 100 microns to about 250 microns.

11. The polyamide hollow fiber membrane of claim 1, wherein the compressible frame comprises a rectangular frame and elastomeric material positioned along opposing edges of the frame, wherein the elastomeric material compresses as a wound hollow fiber shrinks along it length.

\* \* \* \* \*